Feb. 4, 1936.  H. A. SHELDON  2,029,344
GREEN CORN CUTTER
Filed Dec. 14, 1931  9 Sheets-Sheet 1
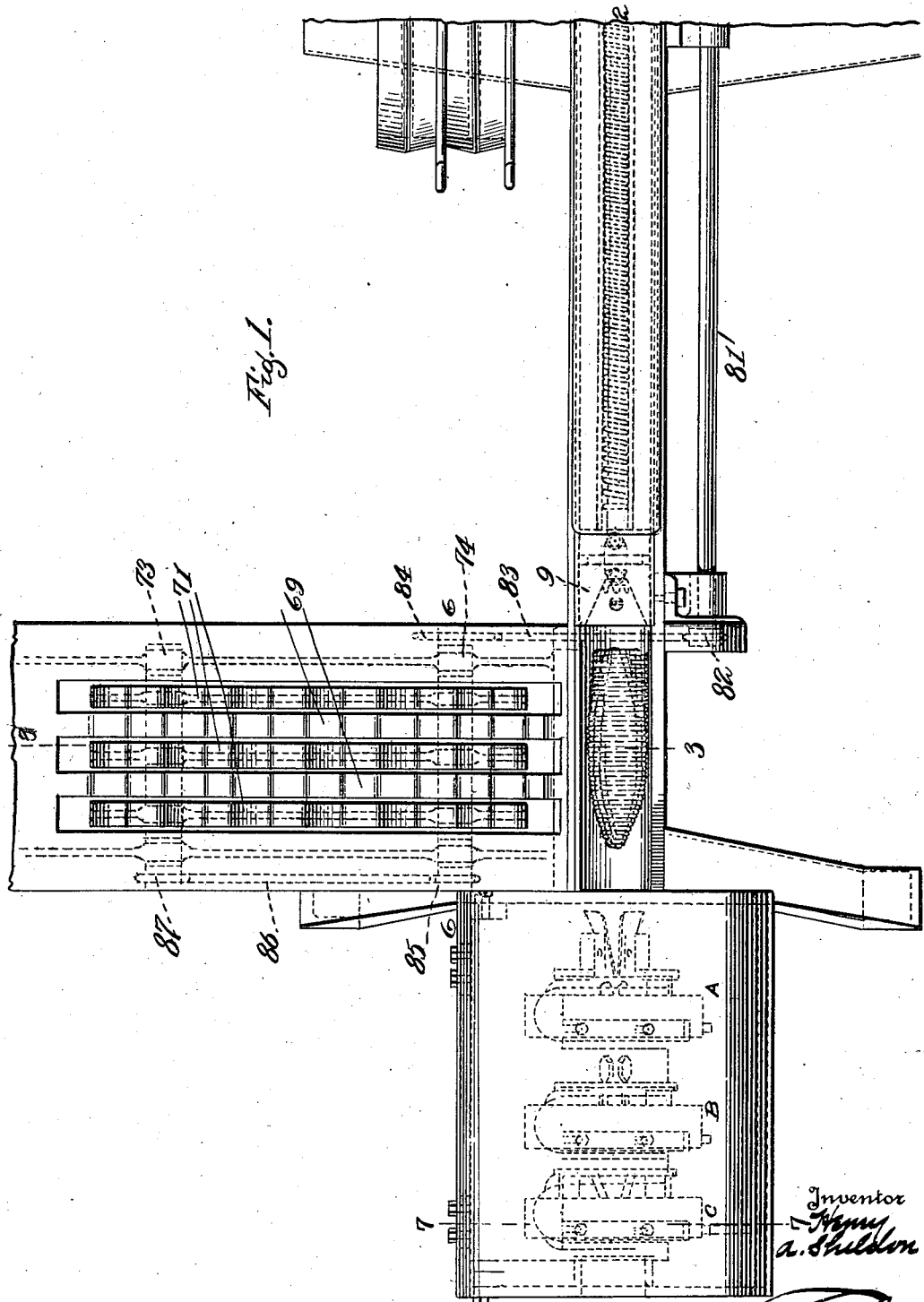

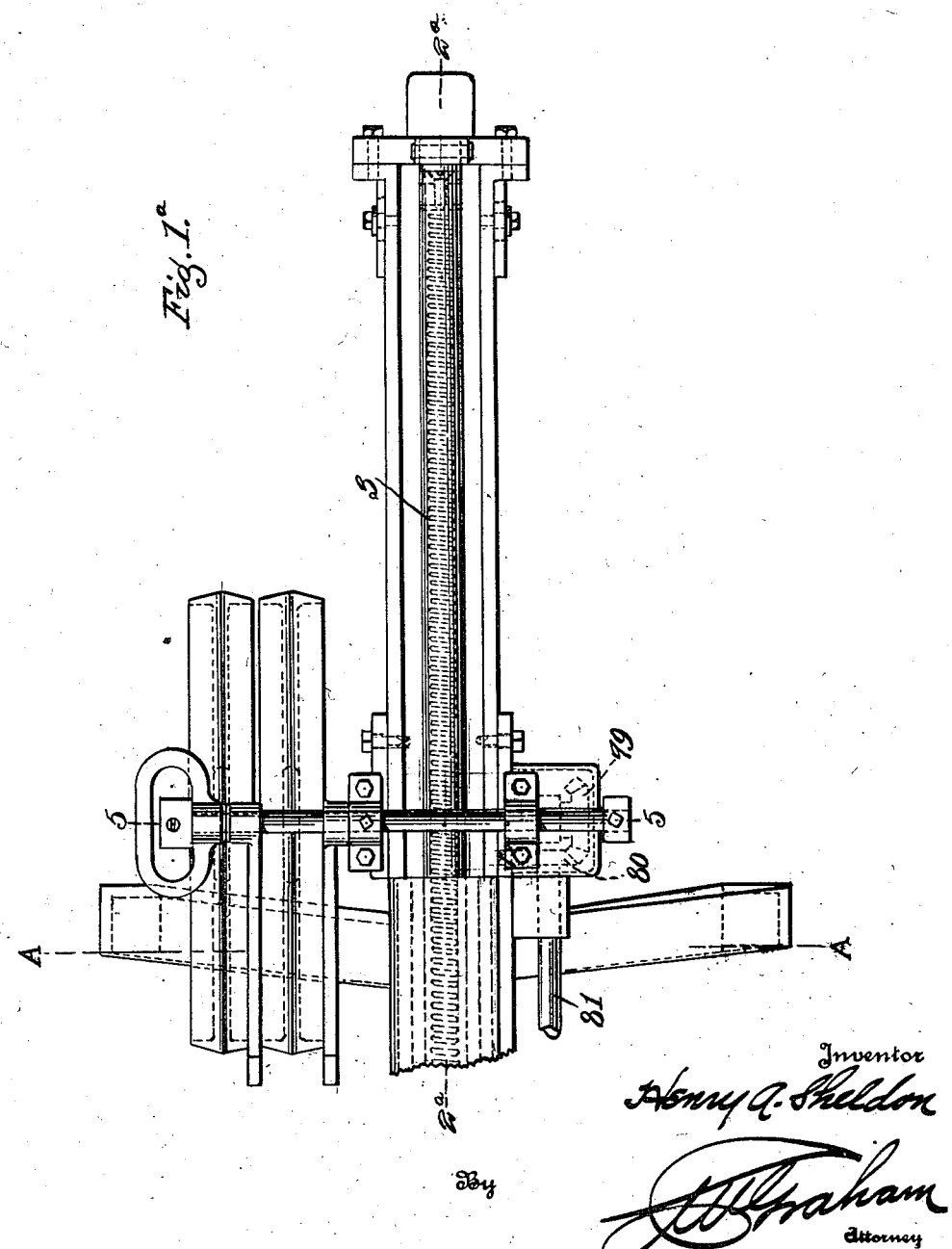

Feb. 4, 1936.  H. A. SHELDON  2,029,344
GREEN CORN CUTTER
Filed Dec. 14, 1931   9 Sheets-Sheet 3
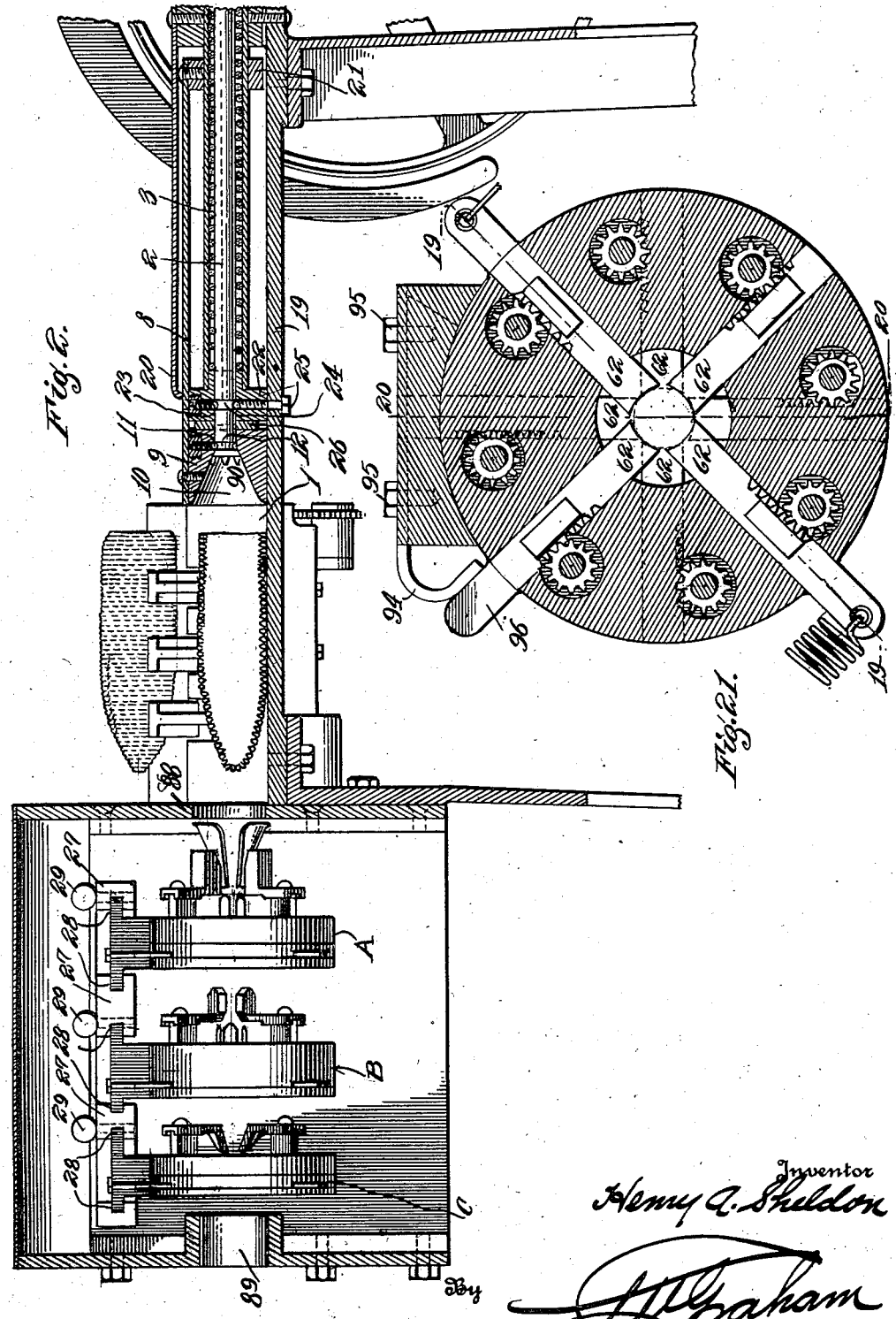

Feb. 4, 1936.    H. A. SHELDON    2,029,344
GREEN CORN CUTTER
Filed Dec. 14, 1931    9 Sheets-Sheet 4
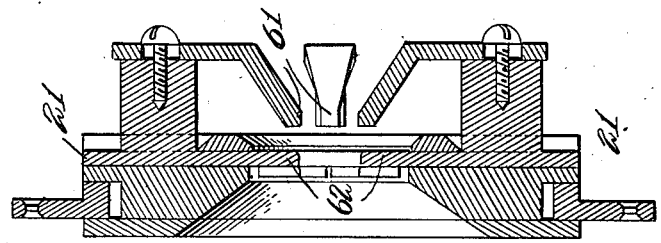
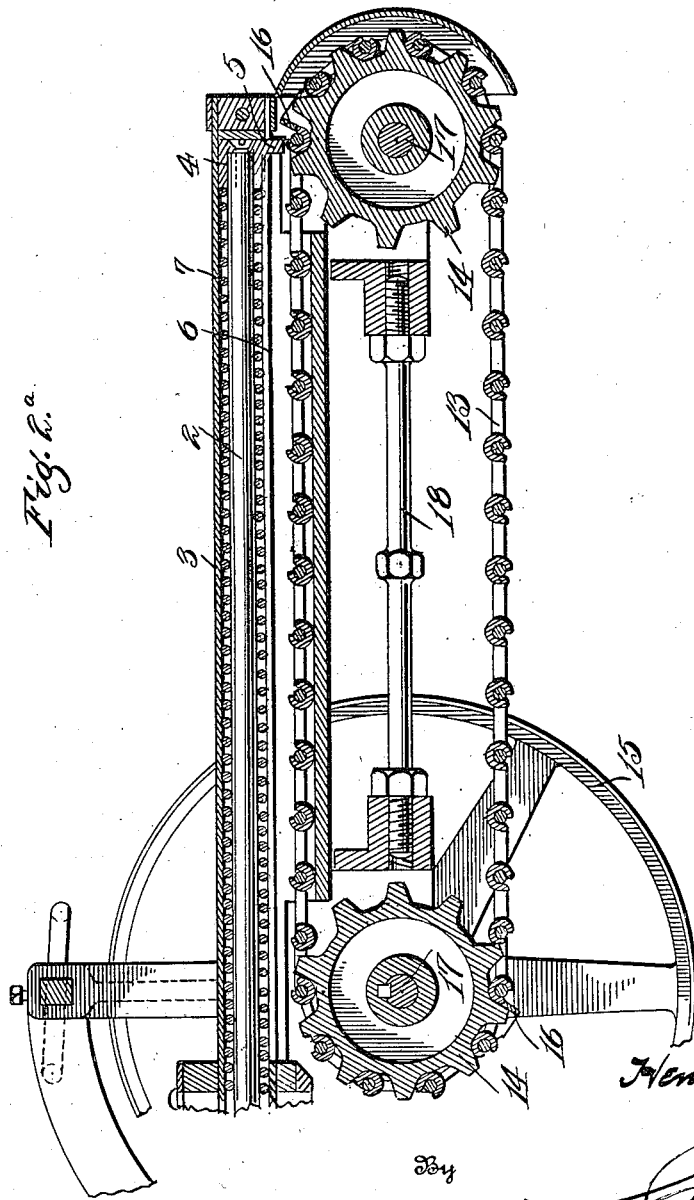

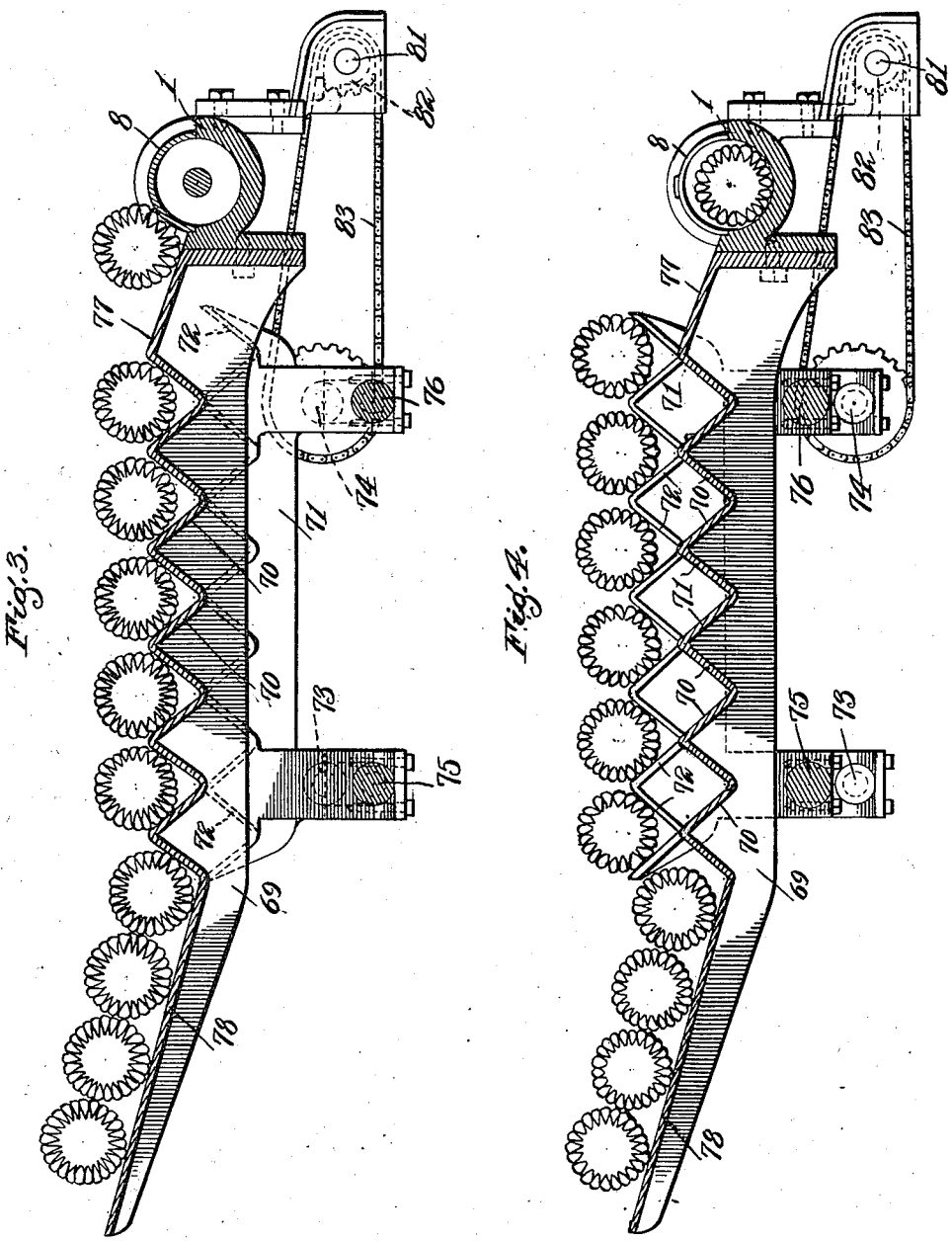

Feb. 4, 1936.  H. A. SHELDON  2,029,344
GREEN CORN CUTTER
Filed Dec. 14, 1931   9 Sheets-Sheet 6
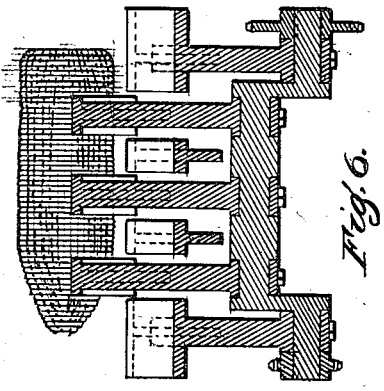
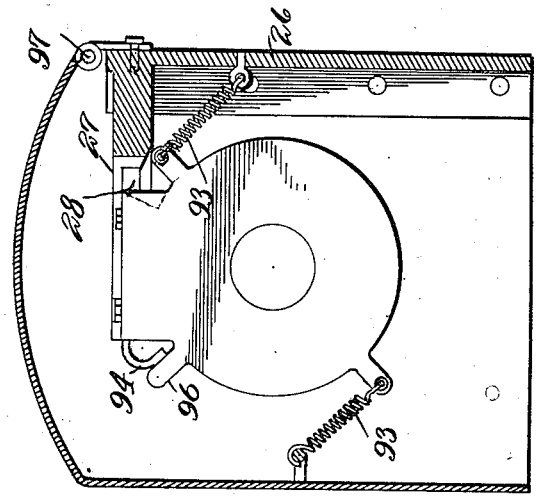
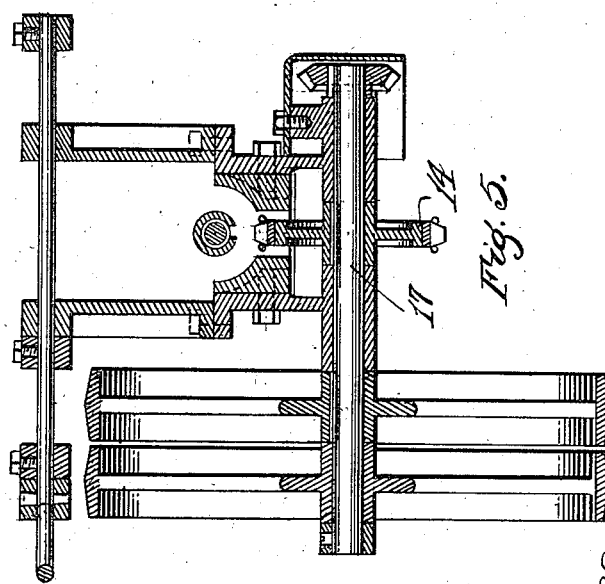
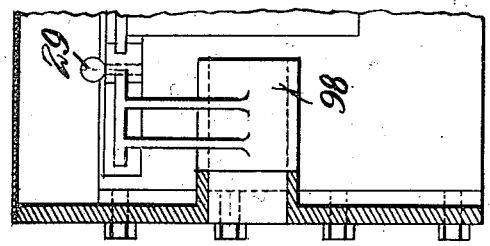
Inventor
Henry A. Sheldon
By
Graham
Attorney

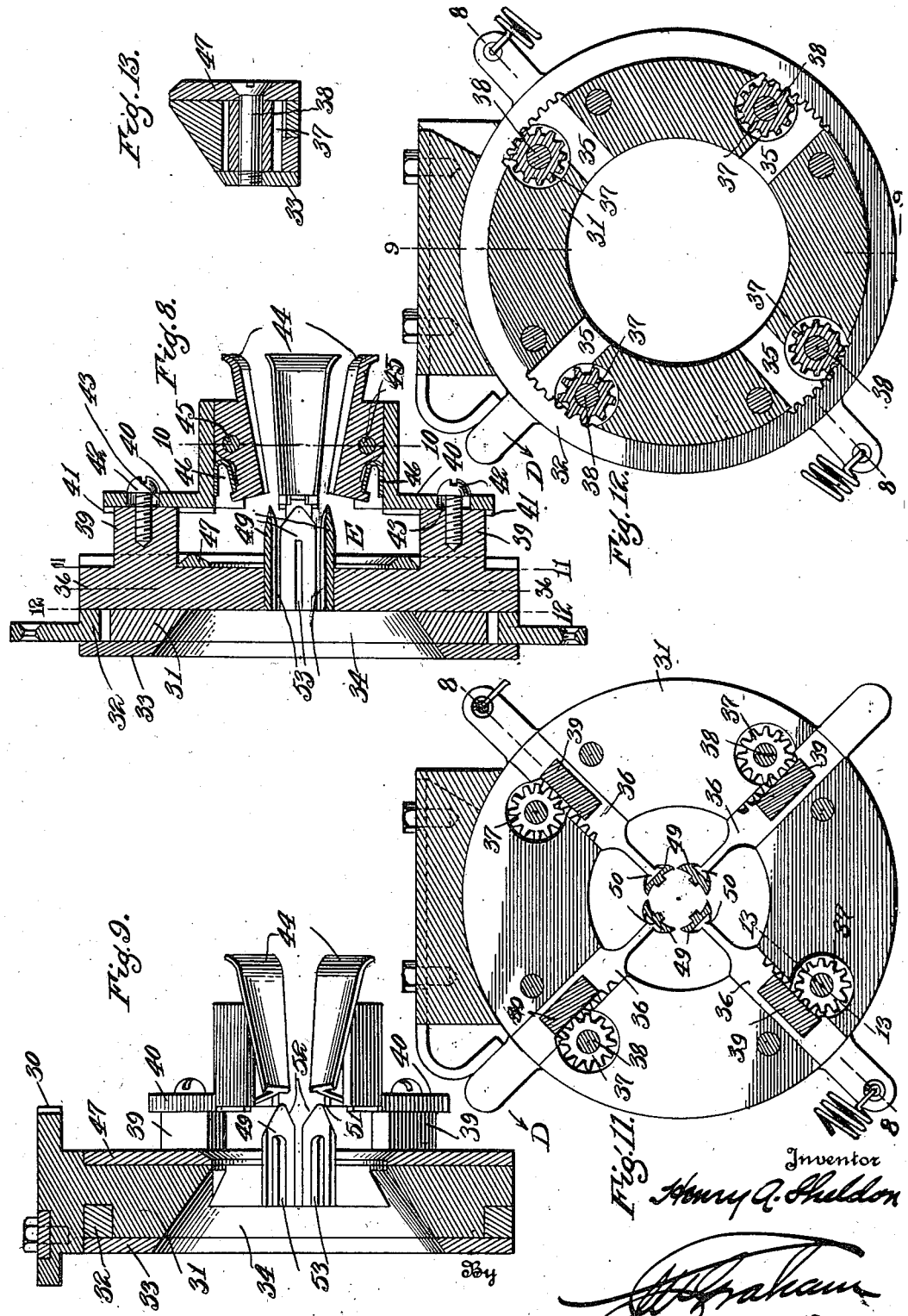

Feb. 4, 1936.　　　　H. A. SHELDON　　　　2,029,344
GREEN CORN CUTTER
Filed Dec. 14, 1931　　　9 Sheets-Sheet 8
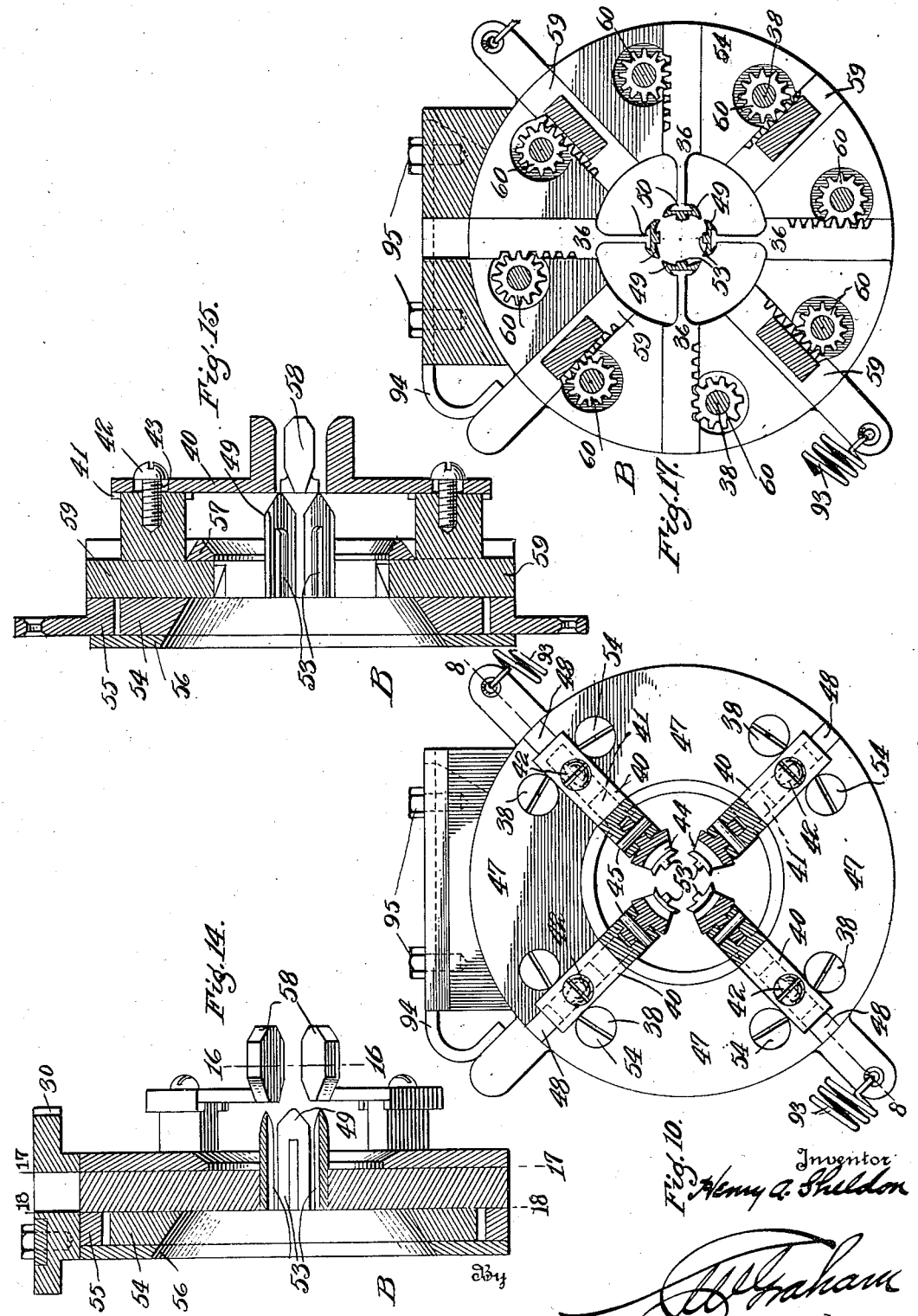

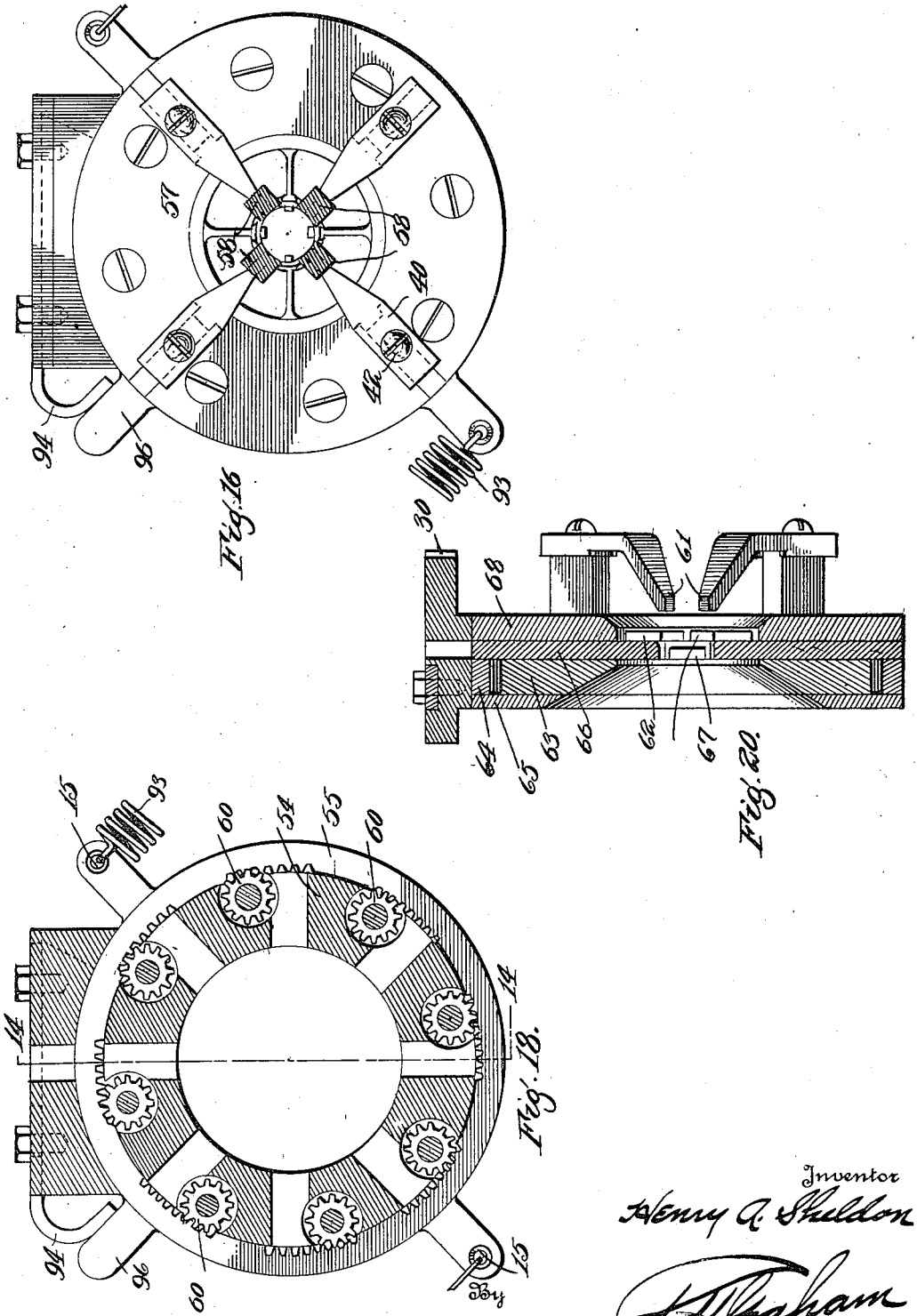

Patented Feb. 4, 1936

2,029,344

UNITED STATES PATENT OFFICE 2,029,344

GREEN CORN CUTTER

Henry A. Sheldon, Buffalo, N. Y., assignor to Food Machinery Corporation, San Jose, Calif., a corporation of Delaware Application December 14, 1931, Serial No. 580,981

8 Claims. (Cl. 130—9)

This invention relates to a machine for cutting green corn from the cob and is particularly adapted to cut what is known in the trade as "Cream Style", corn, but is also adapted to cutting whole grain corn with suitable adjustment.

This improved machine is of the intermittent feed type with stationary cutting heads through which each ear of corn is passed by suitably arranged reciprocating mechanism. The machine is provided with an automatic feed device that accurately places and feeds each ear to the cutting heads, which are arranged in succession so that the ear moves from one to the other in substantially a straight line.

The machine possesses a number of very important improvements in machines of this type tending to more accurate and efficient operation. The kernel cutting elements and ear guide devices have been arranged to synchronize perfectly in their movements so that each ear of corn presented will be handled and operated upon as an individual and according to its peculiar characteristics. Ears of green corn coming from the field are of all sizes and shapes, and in previous machines there has been much difficulty in providing machines of a universal character that would successfully handle these varied ears of green corn to give the best results.

The movable cutting and ear guide elements have been arranged and mounted to move in paths that will conform most nearly to a desired standard and which movement is controlled entirely by the ear as it moves from one element to the other in its passage through the machine, the ear being fully centered and aligned to the operative elements before it enters into their operative zone.

The operation of the machine is so calculated that the operation on each presented ear is completely finished before another ear can be presented, therefor there can never be any jamming of the machine by one ear riding upon another and being crowded out of alignment thereby, the feeding mechanism must be fully retracted before a second ear can be presented, and when this happens the first ear has been operated upon and passed entirely from the machine and the cutting and guide parts have assumed their normal inactive positions.

In a reciprocating machine feeding one ear at a time and completely finishing the operation on that ear before another can be presented, the ear feeding mechanism must be so arranged and timed that it will take ears, one at a time, from a supply of ears and present a single ear to the feed, or placing mechanism that moves each ear into and through the operative elements.

Since the general run of ears of green corn all vary more or less in diameter it is necessary to provide efficient centering means as a part of the placing mechanism to accurately center and align each ear as it is presented to the first operating unit of the kernel cutting mechanism, and this centering means should accommodate itself to the differing diameters without the necessity of adjustment or manipulation.

All ears of corn are also tapering and are sometimes much larger at the butt end than at the tip, while others may be larger in the middle than at either end. This natural condition makes desirable feed and guide mechanism that will accommodate itself to the handling of ears having such variations in contour, so that each ear will receive just the proper placement relative to the operating mechanism to have the kernels cut from the cob along the desired lines regardless of the shape or diameter of the presented ear.

Therefor, among the specific improvements embodied in this invention it might be mentioned that it is a principal object of the invention to provide a machine for cutting kernels from the cobs of green corn wherein a single ear of corn is operated upon at a time and the operation fully completed on that ear before another can be presented.

It is also an object of the invention to provide a machine for cutting green corn from the cob wherein the mechanism for presenting the ears to the operating mechanism also acts as ear centering means so that each ear will be properly centered to the operative mechanism in properly aligned condition.

It is a further object of the invention to provide a corn cutting machine wherein the ears of corn are selected from a supply of ears and single ears presented in succession and in timed relation to the ear placing mechanism.

It is also an object of the invention to provide a corn cutting machine having guide elements for centering the ears to the cutting mechanism that can conform to the varying shapes and diameters of the ears as presented.

It is a further object of the invention to provide a corn cutting machine wherein the kernels are cut from the cobs without rotating either the ears or the cutting elements.

It is also an object of the invention to provide a machine for cutting green corn from the cob wherein the ear guide and kernel cutting elements move radially to accommodate themselves to the varying ears of corn presented.

It is a further object of the invention to provide a corn cutting machine wherein the kernel cutting elements are so formed and operated that there is no torsional strains placed on either the cobs or the kernels.

It is also an object of the invention to provide a corn cutting machine wherein the cutting elements have runner guides that bear on the cobs and accurately determine the depth of cut as well as help to prevent turning of the cob during the cutting operation.

It is a further object of the invention to provide a corn cutting machine wherein the kernels will be cut from the cob in successive stages, the first cut making opposed channels through the kernels and the second cut removing the remaining kernels.

It is also an object of the invention to provide a corn cutting machine wherein the mounting of the cutters are such that the cut kernels will have a substantially free means of exit from the cutting zone so that the cutting elements and attending parts will not become clogged by residue of corn, silks, etc.

It is also an object of the invention to provide a corn cutting machine wherein the several cutting elements, guide elements and scrapers will be connected by suitable racks and gear mechanism so that all movements thereof will be accurately transmitted from one to the other so that the passing ear of corn will be automatically maintained in a definite straight line of travel.

It is a further object of the invention to provide a corn cutting machine wherein a reciprocating ear placing and feed mechanism is employed wherein a continuous chain drive is used to give an intermittent movement to the reciprocating element.

It is also an object of the invention to provide a corn cutting machine wherein an ear receptacle is provided for receiving single ears of corn from a feed mechanism and from which receptacle each ear is moved to cutting and operating elements before another ear can be received by said receptacle.

It is also an object of the invention to provide a corn cutting machine wherein single ears of corn are placed in a receiving member for transmission to operating elements, and wherein said receiving member is covered so that no further ears of corn may be received therein until the preceding ear has been disposed of.

With such objects in view as well as other advantages inherent in the invention, the novel structural peculiarities, novel organization of elements, and the separate and collective operations involved in carrying out the recited objects of the invention, which will be made the subject matter of claims hereto appended, it is to be understood that the several necessary elements and combinations constituting the same may be varied in their proportions, placement, general arrangement and operative relation without departing from the scope and nature of the invention.

In carrying out the recited objects of the invention in a concrete form or machine, further objects, advantages and improvements have been evolved than have been enumerated, and in order to make the invention more clearly understood there are shown in the accompanying drawings, in a somewhat diagrammatic manner, means and mechanism embodying the preferred structural arrangement and the preferred disposition of the different parts and combinations, in which there has been illustrated one way only, of embodying the creative part or concept of the invention. The described devices are simply embodiments of the invention which other structures might also employ and some of the parts and combinations of parts may be used without the others in differing types of mechanism without departure from the purview of the invention and I therefor regard myself as entitled to such variations from the shown and described devices as fall within the scope and meaning of the claims hereto appended.

Reference now being had to the drawings a clearer and better understanding of the invention will be had, just mentioning beforehand that while these drawings illustrate an embodiment of the invention in an operative machine they are not necessarily made to scale and some of the parts may be exaggerated as to size and location in order to better illustrate the application of the invention.

Figure 1 is a plan of the machine with all parts in their normal inactive positions with an ear of corn reposing in the ear receiving member preparatory to being passed through the machine, this view showing only the left end of the machine.

Figure 1a is a companion view to Figure 1 and comprises the right portion of the machine. A combining of these two views constituting a full plan view of the entire machine.

Figure 2 is a vertical sectional elevation taken on substantially the line 2—2 of Figure 1.

Figure 2a is a vertical sectional elevation taken on substantially line 2a—2a of Figure 1a. Combining Figures 2 and 2a makes a sectional elevation of the complete machine.

Figure 3 is a cross sectional elevation taken on substantially the line 3—3 of Figure 1 and shows the ear feeding device in one position.

Figure 4 is a companion view to Figure 3 taken on the same line and shows the ear feeding mechanism in another position.

Figure 5 is a vertical sectional detail taken on substantially the line 5—5 of Figure 1a.

Figure 6 is another vertical sectional detail and is taken on substantially the line 6—6 of Figure 1 showing an ear of corn resting in one position of the feed table.

Figure 7 is a sectional elevation taken on substantially the line 7—7 of Figure 1 which passes through the scraping head mechanism.

Figure 8 is a sectional view of the primary cutting head and is taken on substantially the lines 8—8 of Figures 10, 11 and 12.

Figure 9 is a sectional view taken on substantially the lines 9—9 of Figure 12, but showing more of the mechanism than is shown in Figure 12.

Figure 10 is a sectional elevation taken on substantially the line 10—10 of Figure 8.

Figure 11 is a sectional view taken on approximately the line 11—11 of Figure 8.

Figure 12 is a sectional view taken on substantially the line 12—12 of Figure 8.

Figure 13 is a sectional detail view taken on substantially the line 13—13 of Figure 11.

Figure 14 is a sectional elevation of the secondary cutting head taken on substantially the line 14—14 of Figure 18.

Figure 15 is a sectional view taken on substantially the line 15—15 of Figure 18.

Figure 16 is a sectional view taken on substantially the line 16—16 of Figure 14.

Figure 17 is a sectional view taken on substantially the line 17—17 of Figure 14.

Figure 18 is a sectional view taken on substantially the line 18—18 of Figure 14.

Figure 19 is a sectional view taken on substantially the line 19—19 of Figure 21.

Figure 20 is a sectional view taken on substantially the line 20—20 of Figure 21.

Figure 21 is a sectional view taken on substantially the line 21—21 of Figure 19.

Figure 22 is a diagrammatic view showing the relation of the kernel cutters in the first cut which produces four grooves axially along the ear and leaves rows of uncut kernels for the next set of cutters.

Figure 23 is a diagrammatic view showing the relative positions of the cob guides in the second cutter head and the rows of uncut kernels.

The general plan of this machine comprises a receiving trough 1 into which ears of green corn are placed intermittently by a suitable ear feeding mechanism, to be fully described, the trough being located longitudinally between ear moving mechanism and kernel cutting mechanism. The ear moving mechanism comprising a rather long reciprocating plunger rod 2, mounted in a tubular casing 3. The rod 2 carries a driving head 4 on its rear end with a projection 5 riding in a slot 6 along the under side of the tubular casing 3. The rod 2 being held retracted into the casing 3 by the compression spring 7.

The forward end of the casing 3 carries a shield member 8. The forward end of the rod 2 carries a centering head 9, having a conical opening 10 which engages the butt end of the ear and centers it to the operating mechanism in advance of the ear. The centering head 9 carries a spring pressed retaining ball 11 which engages in groove 12 in the forward end of the rod 2 tending to hold the rod and casing assembly in operative engagement, but permitting the rod to move out of the casing and head when the head 9 has reached the limit of its forward movement, the rod 2 upon its return movement under the urge of the spring 7 again engaging with the retaining balls 11 and thus establishing normal relation therebetween.

The rod 2 and casing 3 are moved longitudinally during the ear moving operation by means of the continuously moving chain 13 located directly under the rear end of the casing 3 and driven through the sprockets 14 and pulley 15. The chain 13 carries two driving lugs 16 which intermittently engage with the lug 5 on the rod head 4, and moves the rod 2 to the limit of its movement. The sprockets 14 are mounted on suitable shafts 17 and the chain 13 is maintained in adjusted tension by means of the turn buckle rod 18.

The head 9 slides along the base plate 19 in its forward movement and is also supported along its top surface by the shield member 8 riding through the casing member 20 which acts as a bearing and guiding means. The inner end of the shield member 8 being supported by the collar 21 sliding on the casing 3.

The rod 2 is also supported at its forward end by means of the fixed collar 22 through which it slides and is held in normal location by means of the retaining ball 23 in the groove in the rod 24, the collar 22 being held in location by the cap screw 25. There is an abutment washer 26 located between the collar 22 and the head 9 to absorb the shock of the returning rod 2 under the urge of the spring 7.

Located on the other end of the ear receiving trough 1 are the operating heads for removing the kernels from the cobs, located in a suitable casing to protect them from débris and to confine the cut corn and direct it to the receptacles placed under the operating elements. These heads might conveniently be designated generally as "A", "B" and "C". Head "A" is illustrated in detail in Figs. 8, 9, 10, 11 and 12, while Fig. 7 shows the manner of mounting the heads in the casing for easy removal. Referring to Fig. 7 it will be seen that one side of the casing comprises a member 26 with a lateral extension 27 on which the heads A, B and C are slidably mounted by means of a tongue and groove arrangement as at 28. This manner of mounting enables a quick removal and replacement of heads during operation with the minimum of stoppage. The heads being held in central positions laterally by means of the pins 29 which cut into the edges of the tongues as at 30. These pins are hand manipulated and quickly removed and replaced. See Fig. 2 also.

Referring now to Figs. 8 to 12 we will describe the structural details of the cutter "A".

A main body member 31 carries the moving elements comprising a ring gear 32 mounted in a groove in the body 31, the ring gear 32 being held in place by the ring plate 33. The body member 31 having a relatively large conical opening 34, for the free passage of cobs and kernels.

Slideways 35 are cut into the body 31 in which are mounted the knife holders 36. At the sides of the slideways 35 are pinions 37 mounted on studs 38. The pinions 37 mesh with teeth cut in the ring gear 32 and with teeth cut in the knife holders 36. Each knife holder 36 carries an extension laterally therefrom as at 39 in which are adjustably mounted ear guide holders 40 which are aligned by the tongue connection 41 and held in place by the screws 42 covering the slots 43.

Ear guides 44 are pivoted to the holders as at 45 and are held in normal position by the springs 46. The guides are pivoted to enable them to align properly with different size and tapered ears.

The knife holders 36 are held in place in the slideways 35 by a plate 47 bolted to the face of the body member 31 which has slots therein to permit radial movement of the knife holders 36, the slots accommodating the lateral extension 39 on the knife holders. These slots are indicated at 48 and extend to the outer periphery of the plate 47 so the knife holders 36 may be removed radially from the body 31.

The kernel cutting knives 49 are mounted on the inner ends of the knife holders 36 by a taper dovetail connection so that they may be simply driven into place and held by friction without other fastenings and are therefor easily removable for replacement whenever necessary, as see 50. The points or cutting edges of the knives have a central cutting point 51 and diverging cutting edges 52 which gives a double shear cut but does not introduce any torsional strains on the ear while the kernels are being cut from the cobs. The knives are also provided with runners 53 on their inner surfaces which engage the surfaces of the cobs just back of the cutting edges and tend to steady the cutting edges, prevent the knives from digging into the cobs, and tend to prevent turning of the cobs during the cutting operation so that the line of cut will be substantially axially of the ear. The inner surfaces of the knives are made circular to correspond to the circular contour of the cobs and thus enable the cutting edges to cut as closely to the cob as may be desired.

The plate 47 which clamps the radial knife holders in the slideways has securing bolts 54 in addition to the bolts 38 mentioned.

The operative description will give such additional details of structure as may seem necessary to fully describe the primary cutting head "A".

A description of the secondary cutting head "B" will now be given.

This secondary cutting head is substantially like head A except that the cob guide members are geared directly to the controlling ring gear instead of being mounted on the knife holders as in head A, so that their movement helps to move all of the elements connected to the gear ring.

There is the same body member as in head A but designated by 54, a ring gear 55, the back securing plate 56 and the front plate and ring 57 for holding the knife and guide holders in place.

It will be understood that when the ear of corn reaches this secondary head there are four grooves cut through the ear axially where the kernels have been removed by the knives in head A which will leave four rows of uncut kernels on the cob to be removed by the knives in head B. The cob guides and knives in head B are therefore set in different radial planes so that the cob guides will follow the grooves between the rows of uncut kernels and the knives will cut the remaining kernels from the cobs. This brings the cob guides and knives on 45 degree intervals, while in head A the knives and guides were on the same radial plane and therefore on 90 degree intervals.

The knives in head B are exactly like the knives in head A and are therefore given the same designating numerals, as well as the knife holders.

The cob guides in head B are of different shape than in head A and are made narrow and long as at 58 so that they will just about fill the grooves cut through the ear by the knives in head A and bear on the cob to center and guide it as it is passed through the head, and since these guides are secured to slides 59 which in turn are geared to the ring gear 55 they in their movement help to move the cutters 49 according to the diameters of the cob. The cob guides 58 are secured to the slides 59 in the same manner as the guides 40 are fastened to the slides 36 in head A.

The pinions 60, there being eight in this head, are mounted in exactly the same manner as in head A and therefore do not require a special description.

We can now pass to the scraping head "C" where the final residue of the kernels is scraped from the cobs before they are ejected from the machine.

The scraping head "C" is illustrated in Figs. 19, 20 and 21 and is exactly like cutting head "B" except in the shapes of the cob guides and in that instead of knives there are scrapers to engage the cobs over the entire circumference to scrape the adhering milk and kernel pulp and the germs therefrom.

The cob guides are more or less pointed members as at 61 and are turned inward toward the scrapers, while the scrapers are simply flat bars moving in the slideways, and connected by suitable pinions to a ring gear which acts to move the guides and scrapers 62 in unison.

In order to cover the entire circumference with the eight scrapers shown the first four are set at 90 degree intervals and the second four at 90 degree intervals but on a different plane and on 45 degree intervals with the first four scrapers, this makes the scraping points overlapping so that the entire surface of each cob will be fully covered and all residue of kernels and milk will be effectually removed. The head structure that permits this arrangement is shown well in Fig. 20 where 63 is the main head body, 64 the ring gear, 65 the back plate. An intermediate plate 66 is mounted on the front of the body 63 and is grooved as at 67 for one set of four scrapers and another plate 68 is secured on top of plate 66 and is grooved for the other set of four scrapers, all of the scraper bars meshing with the pinions as shown in Fig. 21, so that they all contribute to the movement of the ring gear 64 when they are expanded by a passing cob.

There now remains a description of the automatic feed device for placing the ears in the trough I preparatory to movement through the cutter heads to have the kernels removed. Figs. 1 to 6 show various forms of this device and Figs. 3 and 4 go into further detail.

The best views for an examination of this automatic feed are 3 and 4, 3 showing the ears of corn at rest on the stationary feed table 69 provided across its upper surface with a series of spaced troughs 70 into which ears are successively placed and held during the step by step feed operation. 71 indicates a movable feed element having troughs across its face as at 72, which coincide in spacing with the troughs 70. The feed element 71 is mounted on the crank shafts 73 and 74 and is moved through a circular path by the cranks 75 and 76. The position of the feed element 71 in Fig. 3 is at its lowest point of movement, and at Fig. 4 at its highest point of movement. As the feed element 71 moves through its circular path the troughs 72 pick up the ears resting in the troughs 70 and move all of them one step ahead and place each in the next advancing trough and drops the ear at the right side of the feed onto the inclined face 77 of the table 69 where it rolls down this incline and lodges against the shield member 8 which blocks its entrance into the trough I until the shield 8 has retracted into its position of Fig. 2 as it is shown in Fig. 4. At the same circular movement of the feed element 71 the trough at the left side of Fig. 4 picks up an ear of corn from the supply resting on the inclined face 78 of the table 69 and places it in the first trough at the left of this view. In this manner ears of corn are picked from the table at 78 and intermittently placed in the next advancing trough until finally fed to the trough I to be moved into the cutter heads A, B and C.

Fig. 1 shows a plan of this feed device and shows clearly the lateral arrangement of the table and feed elements 69 and 71.

The elements 71 are moved through the pulley shaft 17, the mitre gears 70 and 80, Fig. 1a, the shaft 81, sprocket 82, chain 83, sprocket 84, cross shaft 74, sprocket 85, chain 86, sprocket 87 and cross shaft 73, the chain 86 causing both the shafts 73 and 74 to move in unison so that the feed elements 71 have a circular parallelogram movement.

The foregoing description has given a fair idea of the general arrangement and structure of this machine, there will now follow an operative description that will point out additional details that may not have been fully explained in the foregoing.

Operation

The beginning of operation would find the elements of the machine in substantially the positions of Fig. 1, but possibly without an ear of corn lying in the trough 1 as shown. A supply of corn would be placed on the table as at 78 and the machine started, or an operator might place a series of ears in the troughs 70 by hand so that as soon as the machine started to move an ear would be delivered to the trough 1.

The feed elements 71 are so timed in their movement that an ear is dropped onto the incline 77 just before the shield member 8 uncovers the trough 1 so that the instant the trough is exposed the waiting ear will drop therein. At this point one of the lugs 16 on the chain 13 will engage the lug 15 on the head 4 carried by the rod 2 and begin to move the rod 2, the centering head 9 and the shield member 8 forward, the cone 10 of the head 9 will engage the resting ear and center the butt end and begin to move the ear forward toward the cutter head A, passing through the hole in the casing to enter the head. When the centering head 9 abuts against the casing at the point 88 Fig. 2 its further movement is arrested, but since the lug 16 on the chain 13 is still in engagement with the lug 15 the rod 2 will continue to move and will compress the spring 7 and will continue to move until the ear is pushed entirely through the three heads A, B and C and the cob discharged from the other side of the casing through the hole 89. The points 90 on the end of the rod 2 bite into the butt end of the ear and hold it securely as it is pushed through the cutter heads. When the rod 2 has reached the end of its stroke and pushed the cob out of the hole 89 the lug 16 on the chain 13 will slip off the lug 15 releasing the rod which will instantly snap back into its normal position through the expansion of the compressed spring 7, and come to rest as in Fig. 2 with both the balls 11 and 23 snapped back into the grooves 12 and 24 which locks the head 9 to the rod 2 for the next feeding movement. As the head 9 moves to its forward position against the casing at 88 it carries the shield member 8 with it and thereby covers the trough 1 so that another ear of corn cannot be placed into the trough 1 until the shield 8 is again moved back to its normal position of Fig. 2.

The ears of corn are fed to the cutter heads point first since that is the smaller end and the cutter elements are thereby expanded by the entering ear as it is gradually pushed forward by the rod 2.

As soon as the point of the ear contacts with the first set of centering shoes 44 these shoes will turn slightly on their pivots 45 against the tension of the springs 46 and will ride over the tops of the kernels thus centering the point of the ear to the cutters 49, and on account of their pivotal movement will accommodate themselves to the taper of any ear presented and will have substantially a full bearing over each ear. The shoes or guide members 44 are adjusted radially by means of the slots 43 so that when their inner surfaces rest on the tops of the kernels the points of the cutters 49 will cut the kernels to the desired depth relative to the cobs, and in cutting the "cream style" corn the cut is usually a little away from the cob surface so that a small portion of the kernel remains on the cob to be scraped off in the last head C.

Having adjusted the guide shoes 44 to give the desired depth of cut the entering ear will immediately expand the guides 44, and since they are mounted on the knife holders 36 as soon as they begin to open against the urge of the entering ear they will carry the knife holders along with the opening movement, with the result that all of the pinions 37 will be rotated and the ring gear 32 moved in the direction of the arrow D Figs. 11 and 12 which ring has the effect of keeping the guides and knives in concentric relation to the ear and all moving together in unison, so that there is equal expansion of the guides and knives from the axis of the ear. This condition permits the ear to move through the head on a straight axial line which conduces to the most accurate and efficient cutting.

As soon as the point of the ear touches the points 52 of the knives 49 the cut begins and the cut kernels fall from the cutters out into the space E Fig. 8, and fall into receptacles placed thereunder to catch them, or into a chute that leads them to the next operation in their preparation for canning.

The divergent cutting edges 52 cutting on each side of the point of the cutters gives a double shearing cut but has no tendency to set up torsional strains in the ear so that it moves forward without any tendency to turn or twist, and as soon as the cut has started the runners 53 will bite into the cob surface and tend to guide the ear in a straight line.

The four cutters of the head A will cut four grooves axially along the surface of the cob as is indicated at 91 Fig. 22, which shows the kernels 92 severed from the cob by the knives 49. On account of these grooves it is necessary that the ear be delivered to the next head B without twisting or turning, so that the shoes 58 of head B will ride in these grooves and thus tend to hold the ear in the same relation to the cutters 49 in head B. The cutters 49 in head B being set at 45 degree intervals with the cutters 49 in head A will then cut the remaining rows of kernels from the ear as it is passed through head B.

The runners 53 on the cutters 49 in head B will ride into the cob surface following the cut and help to hold the ear on its straight non-twisting path.

On account of the four grooves in the ear produced by the cutters 49 in head A the adjustment of the guide shoes 58 of head B are in different relation to the cutting edges of the knives 49 in the head B than in head A. In this instance the inner surfaces of the shoes 58 are substantially on a line with the cutters because they are bearing on the cut portions of the cob in the four grooves instead of on top of the kernels as in head A. In head B both the guide shoes and the cutters with their holders are connected to the ring gear 55 by means of the pinions 60 so that the guides and cutters both have the same influence in turning the ring gear 55 against the tension of the springs 93.

As the ear passes from head B all of the kernels have been cut from the cob, but on account of the setting of the knives there is a residue of kernel pulp and the germ remaining on the cob with the cob portion of the kernel skin. The next and last operation consists in removing this residue of material.

The head C is designed to scrape this residue from the cob and is accomplished by the eight scraper bars 62 which on account of their mounting have overlapping scraper ends which completely encircle the cob and scrape all adhering material from the cob surface. The adhering kernel skins are not usually scraped off and are not usually desired, and sometimes the germ of the kernel is not desired in which case the adjustment of the scrapers may be such that excessive pressure is not applied in this scraping operation. Fig. 21 shows clearly how the ends of the scraper bars 62 overlap to cover the entire circumference of the cob so as to scrape the entire surface with one passing. The overlap is sufficient also to take care of varying diameter of cobs.

The initial adjustment of the opening between the scraper ends of the bars 62 is made by the stop member 94 secured by bolts 95 to the top of the head member and which is adjustable so that the ring gear stop finger 96 may be stopped in any desired position to control the opening of the scraper bars. This same stop member and adjustment is present in each of the heads A, B and C, so that the elements may be set to the minimum opening desired to accommodate small or large ears. If large ears are dominating, or the ears are roughly sorted before presentation to the machine the adjustment may be made first for one size and after all of this size are run through the adjustment may be changed for the next size, or if sorting is not resorted to then the adjustment may be made according to the general run of the corn and changed from time to time to suit any changes in ear sizes.

The easy and rapid removal and replacement of the cutter heads is an important feature of this invention. During operation it may become necessary for various reasons to remove and replace cutter heads. By reference to Fig. 2 it will be seen that the heads are suspended on a lateral hanger member 27 formed integral with the cutter head casing. The connection is by a sliding dovetail and the heads are held centrally by hand manipulated pins 29 so that it is only a moment to withdraw a pin, unhook the springs 93 from the casing and slide the head out of its mounting and slide a new head in place and secure it with the pin 29, hook up the springs 93 and go ahead with only a moment's stoppage of the machine.

The casing covering the cutter heads is hinged at 97 and by first unhooking the front spring 93 the casing cover may be turned back exposing the heads which may be pulled out of their supports without hindrance.

The machine may be set and adjusted for cutting whole grain corn. The adjustment of the ear guides and cutters in the heads A and B would be a little different for whole grain corn than for the "cream style corn".

The guides would be set so the cutters would cut close to the cob and the scraper head would be eliminated and replaced by a tubular member 98 Fig. 4 which would simply act as a guide for the cob to prevent it from sagging and getting caught in the head casing. This tubular guide member 98 would be supported in the hanger in the same manner as the regular scraper head. Otherwise the operation of the machine would be the same as for the other style corn.

As a cutter for whole grain corn the machine is very efficient, since the coordination of the two cutter heads and the guides and knives are such that the most efficient and accurate cutting will result. The cutters with their runners sliding along the cob directly back of the cut, support the cob in a manner that the cut adjustment is very accurately maintained and the cut relative to the cob surface is most uniform and regular.

What I claim as new and desire to secure by Letters Patent is:

1. A machine for removing kernels from the cobs of green corn comprising kernel removing means, ear feed means consisting of an intermittently reciprocating member comprising a tubular member and a plunger movable through said tubular member, and a yielding member holding the plunger retracted within the tubular member, means for moving said associated members in unison for moving a positioned ear into said kernel removing means, means for stopping movement of said tubular member after a partial feed stroke the actuating means continuing the movement of said plunger to complete the movement of the ear entirely through the kernel removing means, and compressing said yielding member, the release of said compression acting to replace said reciprocating member to its inoperative position.

2. A machine for removing kernels from the cobs of green corn comprising kernel removing elements, ear feed means comprising a reciprocating member and a continuously moving member, said reciprocating member consisting of a tubular section and a plunger section, yielding means associated with said members for holding them in normal operative relation, said continuously moving member intermittently engaging said plunger section and moving both said plunger and tubular sections in unison to move said ear into the kernal removing elements, means for stopping the movement of said tubular section before the said plunger section has completed its movement in passing the ear entirely through the kernel removing elements, said yielding means being compressed thereby, the release of said compression acting to replace said reciprocating member to its inoperative position.

3. A machine for removing kernels from the cobs of green corn comprising means for separating the kernels and contents from the cogs, means for selecting single ears from a supply and moving them to an aligning station, means in operative relation with said aligning station to move said positioned ears entirely through said kernel separating means, said ear moving means comprising a tubular member, a reciprocating plunger and a gate forming a complete unit for blocking access to said aligning station during a feeding stroke, means for intermittently engaging and moving said members in unison for a part of a complete movement and for moving said plunger a complete movement for passing an ear entirely through said kernel removing means, said means then releasing said ear moving means and independent means for returning said ear moving means to its inoperative position.

4. An apparatus for cutting green corn from the cobs for canning purposes comprising a series of operating heads for removing the kernels from the cobs, means for aligning ears of corn with said heads, reciprocating means for pushing the aligned ears entirely through said heads to cut the kernels from the cobs, said reciprocating means including a plunger and a sleeve in telescopic relation and a yielding means associated therewith for holding said plunger and sleeve in a non-feeding retracted position, a plurality of continuously moving releasable feed means for successively engaging said plunger and moving it and the said sleeve through a feeding stroke to pass an aligned ear of corn through said operating heads, the movement of said plunger and sleeve acting to compress said yielding means, the release of said feed means from said plunger permitting said compressed yielding means to rapidly expand and return said plunger and sleeve to their inactive positions and in place for another feeding cycle.

5. An apparatus for cutting green corn from the cobs for canning purposes comprising a series of operating heads in axial alignment for removing the kernels from the cobs, means for feeding individual ears of corn into alignment with said operating heads, reciprocating means, means for successively pushing said aligned ears through said operating heads to remove the kernels from the cobs, said reciprocating means comprising a plunger inside of a sleeve, a yielding means associated therewith to hold said plunger and sleeve in a non-feeding retracted position, a fixed abutment for said yielding means, a plurality of continuously moving releasable feed means for successively engaging said plunger and moving it and the associated sleeve through a feeding stroke to pass an ear of corn through said operating heads, the said feeding movement acting to compress said yielding means which becomes a power means for returning said plunger and sleeve to their retracted positions when said releasable feed means is disconnected from said plunger.

6. An apparatus for cutting green corn from the cobs for canning purposes comprising a series of operating heads in axial alignment for removing the kernels from the cobs, means for feeding individual ears of corn into operative relation with said heads, reciprocating means for successively pushing said positioned ears of corn entirely through said heads to remove the kernels from the cobs, a plurality of continuously moving releasable feed means for successively engaging said reciprocating means periodically and moving the same through a feeding cycle to pass an ear of corn through said heads, a compressible means associated with said reciprocating means, a fixed abutment against which said compressible means rests, the movement of said reciprocating means through a feeding cycle compressing said compressible means, the release of said feeding means from the reciprocating means at the end of the feeding stroke permitting said compressible means to rapidly expand and thereby quickly return said reciprocating means to its normal inoperative position, the said ear feeding means then placing another ear and a second of said plurality of feed means immediately engaging said reciprocating means to move it through another feeding cycle.

7. An apparatus for cutting green corn from cobs for canning purposes comprising means for removing the kernels from the cobs, means for placing ears of corn in succession into operative relation with said kernel removing means, a reciprocating means for moving positioned ear through said kernel removing means, a compressible member associated with said reciprocating means to hold said means in a normal retracted position, a plurality of continuously moving releasable means for successively and periodically engaging said reciprocating means and moving it through a feeding cycle to move an ear of corn through said kernel cutting means and then releasing said reciprocating means, the feeding movement of said reciprocating means acting to compress said compressible member which in turn acts to quickly expand upon release of said reciprocating means by said feed means and instantly return said reciprocating means to its normal retracted position in readiness for the immediate feeding of another ear of corn through said kernel removing means.

8. An apparatus for cutting green corn for canning purposes comprising a series of sets of cutters arranged in sequence for cutting rows of kernels from the cobs in successive steps, the first set of the series of cutters being arranged in circular formation to completely encircle the cob but spaced circumferentially to leave rows of complete uncut kernels longitudinally of the cob, the said circular cutters having runners along their inner surfaces to form tracks along the cob which act as gripping means to prevent the cobs from turning during their passage through the cutters, the second set of cutters being positioned at intervals relative to the first set of cutters to cut the remaining rows of complete kernels.

HENRY A. SHELDON.